United States Patent [19]
Hale

[11] Patent Number: 5,901,586
[45] Date of Patent: May 11, 1999

[54] ANTI-THEFT DEVICE FOR AIRCRAFT

[75] Inventor: Charles Richard Hale, Sharon, Pa.

[73] Assignee: Winner Aviation Corporation, Sharon, Pa.

[21] Appl. No.: 08/995,529

[22] Filed: Dec. 22, 1997

Related U.S. Application Data

[63] Continuation-in-part of application No. 08/829,871, Apr. 2, 1997, abandoned.

[51] Int. Cl.$^6$ ..................................................... E05B 73/00
[52] U.S. Cl. ............................ 70/18; 70/19; 70/39; 70/53
[58] Field of Search ................................... 70/18, 19, 39, 70/53

[56] References Cited

U.S. PATENT DOCUMENTS

| | | | |
|---|---|---|---|
| 596,237 | 12/1897 | Damon | 70/18 |
| 837,295 | 12/1906 | Fisher | 70/18 |
| 1,314,775 | 9/1919 | Wells | 70/18 |
| 4,167,862 | 9/1979 | Gould . | |
| 4,257,247 | 3/1981 | Sims . | |
| 4,715,783 | 12/1987 | Wade . | |
| 4,850,800 | 7/1989 | Zygutis . | |
| 5,184,488 | 2/1993 | Sandlin . | |
| 5,417,093 | 5/1995 | Heiberg . | |
| 5,433,092 | 7/1995 | Kuo | 70/18 |
| 5,469,721 | 11/1995 | Pyle . | |
| 5,494,465 | 2/1996 | Jenkins . | |
| 5,503,578 | 4/1996 | Cestaro . | |
| 5,687,701 | 11/1997 | Henry | 70/18 |

*Primary Examiner*—Charles T. Jordan
*Assistant Examiner*—Charles R. Ducker
*Attorney, Agent, or Firm*—Vickers, Daniels & Young

[57] ABSTRACT

A pair of U-shaped or V-shaped collar members of hardened steel are adapted to be lockingly interengaged about a propeller blade of an aircraft propeller to provide an anti-theft device for the aircraft by providing an unbalanced propeller condition in response to starting the aircraft engine. A flag of resilient material depends from the device to alert unauthorized personnel of the latter and to remind authorized personnel to remove the device before starting the aircraft engine.

32 Claims, 6 Drawing Sheets

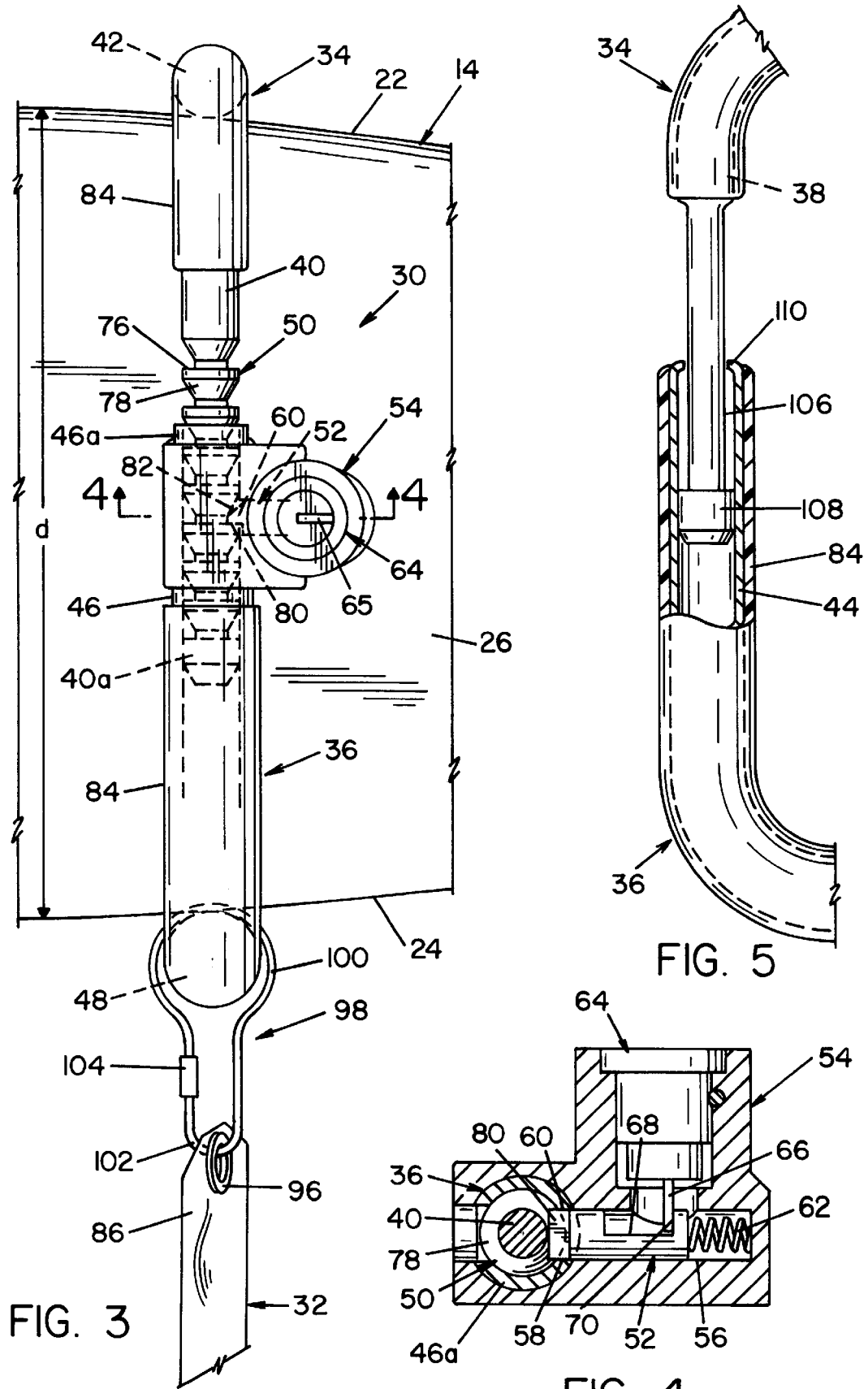

ANTI-THEFT DEVICE FOR AIRCRAFT

This Application is a Continuation-in-Part of application Ser. No. 08/829,871, filed Apr. 2, 1997, now abandoned.

BACKGROUND OF THE INVENTION

This invention relates to the art of security devices and, more particularly, to an anti-theft device detachably mountable on a propeller blade of a propeller driven aircraft to preclude unauthorized operation thereof.

Small, propeller driven aircraft are often parked and left unattended outside in a remote area of a large airport, or outside at smaller, local airports, and in both cases there is very little traffic in the way of individuals in the area and, most often, no provision for security personnel to watch the unattended aircraft. Even if the owner of an aircraft normally parks the latter in a hanger, there are instances where the aircraft is temporarily parked outside the hanger and left unattended, or towed or taxied from the hanger to a maintenance area in which the aircraft is left unattended pending the inspection, performance of maintenance and the like by maintenance personnel. In these and other situations, such aircraft is subject to unauthorized use or operation as well as theft, especially at smaller airports where there is minimal air traffic and thus more than ample opportunity to steal or take a joy ride in the aircraft. Indeed, theft of aircraft is a growing problem.

Some smaller aircraft have key operated ignition systems in which wires can be readily crossed if necessary to enable operation of the engine of the aircraft. However, in connection with such small aircraft, owners often leave the key in place, especially when the aircraft has been parked in the maintenance area, whereby crossing of wires is not necessary to operate the aircraft. Moreover, some owners replace the key switch with a toggle switch, and many aircraft as manufactured do not have a key operated switch and are operable merely by actuating a toggle switch. While small aircraft are often tethered to the ground, such tethering is primarily for the purpose of maintaining the aircraft in place during high winds and is not for the purpose of deterring theft or unauthorized operation thereof. Indeed, such tethering arrangements include rope or other lines which are tied in place or provided with mechanical spring clasps or the like and, thus, are readily detached from the aircraft.

It has been proposed, as shown for example in U.S. Pat. No. 4,167,862 to Gould, to provide one blade of an airplane propeller with a removable device forming an eccentric weight so as to preclude operation and thus theft of the aircraft. However, the devices disclosed in the latter patent are not adjustable and are of a structure readily susceptible to destruction by a person intent upon stealing or otherwise using an airplane without authorization. Moreover, the structures are such that the device is readily displaceable relative to the propeller blade in a manner which can damage the blade and/or the shroud or spinner of the mounted end thereof. The inability to adjust the device relative to a given propeller blade promotes such potentially damaging displacement thereof relative to the blade and precludes selectivity with respect to positioning of the device along the blade. At the same time, use of the device is limited to propeller blades which can accommodate the fixed size of the device. This can restrict the location of the device to a point at which the eccentricity of the weight of the device is not sufficiently effective to preclude operation and thus theft of an aircraft. In particular with regard to the structure of the device, it is comprised of two semi-circular rings pivotally interconnected at one end by a pin and releasably connected at the opposite ends by a padlock, both of which connections are readily destructible by a thief.

SUMMARY OF THE INVENTION

In accordance with the present invention, an attachment is provided which can be easily and readily mounted on a blade of an aircraft propeller and selectively positioned therealong to prevent theft as well as other unauthorized use or operation of the aircraft. More particularly in accordance with the invention, a two-piece collar weighing from about two to three pounds is removably mountable on one of the blades of the aircraft propeller at a distance from the axis of rotation sufficient to create an unbalanced condition in response to rotation of the propeller which, at least, precludes safe operation of the aircraft. Preferably, an elongate strip of flexible material having warning indicia thereon is attached to the collar so as to make the presence of the latter more apparent visually to a would-be thief or other person intending unauthorized operation of the aircraft. Such strip material also reminds the aircraft owner or other authorized person to remove the collar before starting the aircraft engine.

As is known, an aircraft propeller generally includes two, three or four propeller blades extending radially of and supported for rotation about an axis of rotation and each of which blades has mounted and free ends relative to the aircraft. As is further known, a propeller blade has an airfoil profile in cross section transverse to the direction between the mounted and free ends thereof and which airfoil configuration provides leading and trailing edges which diverge relative to one another in the direction from the mounted end toward the free end. In accordance with the present invention, the collar is mountable on a propeller blade at a location between the mounted end and that portion of the blade at which the leading and trailing edges are furthest spaced apart. The collar provides an opening having a major dimension less than the latter spacing between the leading and trailing edges, whereby the collar engages the leading and trailing edges and is precluded from movement radially outwardly of the blade beyond the point of engagement therewith. Thus, the weight of the collar is radially spaced from the axis of rotation and creates an unbalanced condition in response to rotation of the propeller about the axis of rotation. Preferably, the two-piece collar is comprised of a pair of telescopically interengaging U-shaped or V-shaped collar members releasably held in a mounted position on a propeller blade by a key operated locking mechanism, whereby the collar can only be removed by an authorized person having the key. Preferably, the interengaging collar members are adjustable in the direction between the leading and trailing edges of a propeller blade, thus to provide for a given collar to accommodate different sizes of blades and/or to be adjustable relative to the leading and trailing edges of a given blade, thus enabling the user to selectively position the collar radially outwardly from the mounted end of the blade to optimize the out-of-balance condition should someone try to operate the aircraft. Further, the collar is constructed of hard metal which deters cutting or sawing thereof to achieve removal of the collar from a propeller blade. At the same time, authorized use or operation of the aircraft is readily achieved by unlocking and removing the collar members from the propeller blade. Preferably, the two U-shaped or V-shaped collar members are not separable. This advantageously optimizes the deterrent against separating the two parts and provides a single device to be handled by the aircraft owner and, thus, minimizes the likelihood of a part of the device being laid in a position on the aircraft which could result in its being lost or causing damage to the aircraft.

In accordance with another aspect of the invention, the U-shaped or V-shaped collar members advantageously provide for the collar to have parallel legs which can extend closely adjacent the opposite sides of a propeller blade with respect to the direction between the leading and trailing edges thereof. This advantageously minimizes relative rocking displacement between the collar and blade and, thus, potential damage to the blade, especially should someone attempt to operate the aircraft with the collar thereon. Furthermore, the V-shaped configuration of the collar members advantageously provides a configuration at the opposite ends of the collar or in the bight portion thereof between the parallel legs which is contoured to more snugly receive the leading and trailing ends of the propeller blade to further promote restraint against relative displacement therebetween. Additionally, the V-shaped contour of the opposite ends of the collar advantageously limits displacement thereof along a propeller blade toward the end thereof connected to the drive shaft and, in this respect, precludes engagement of the collar with a shroud or spinner which encloses the mounted ends of the blades. This advantageously precludes denting or other potential damage to the shroud by contact of the collar therewith.

It is accordingly an outstanding object of the present invention to provide an improved security device for precluding unauthorized use or operation of propeller driven aircraft.

Another object is the provision of a security device for the foregoing purpose which is removably mountable on an aircraft propeller blade to provide an adjustable unbalanced condition in response to rotation of the aircraft propeller.

A further object is the provision of a security device of the foregoing character which includes a visible indicator for indicating the presence of the device on a propeller blade.

Yet another object is the provision of a security device of the foregoing character comprised of a pair of collar members forming an opening having opposite ends for engaging leading and trailing edges of a propeller blade and which members are adjustable to vary the distance between the ends of the opening for the collar to accommodate different sized blades and/or to be selectively positioned axially outwardly of the mounting end of a given blade.

A further object is the provision of a security device of the foregoing character in which the collar members are configured to interengage with a propeller blade so as to minimize relative rocking displacement therebetween and/or limit displacement of the collar in the direction toward the mounted end of the blade.

Still a further object is the provision of a security device of the foregoing character in which the collar members are releasably locked in a mounted position on a propeller blade by a key operated locking mechanism.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 3 is a plan view of the collar and blade looking in the direction from right to left in FIG. 2;

FIG. 4 is a sectional elevation view of the collar locking mechanism taken along line 4—4 in FIG. 3;

FIG. 5 is a cross-sectional view of a portion of the collar shown in FIGS. 1–3 and illustrating a modification of the arrangement for precluding separation of the collar members;

DESCRIPTION OF PREFERRED EMBODIMENTS

Figure 1:
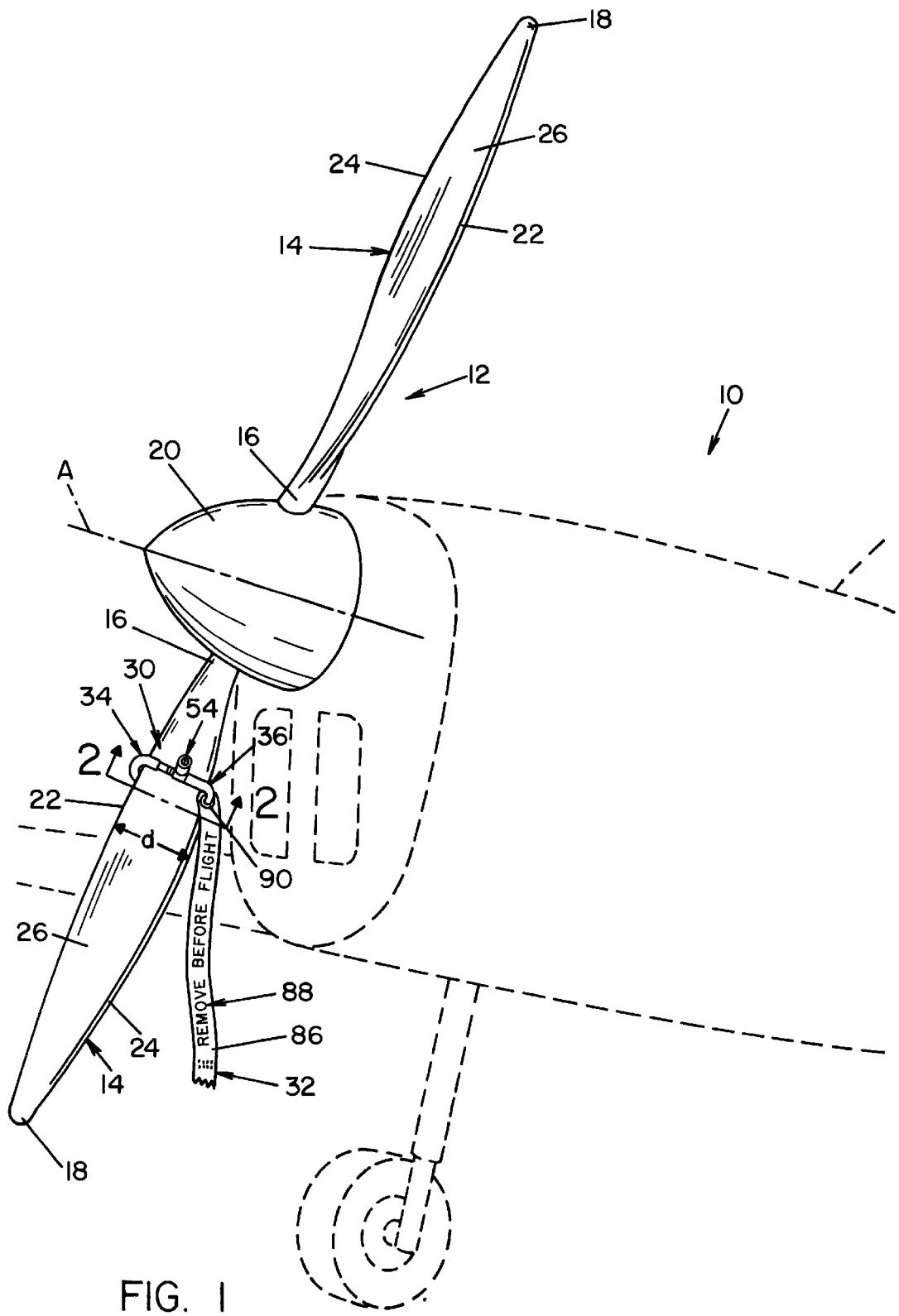
FIG. 1 is a perspective view illustrating a security device in accordance with the present invention mounted on a blade of an aircraft propeller.

Referring now in greater detail to the drawings, wherein the showings are for the purpose of illustrating preferred embodiments of the invention only and not for the purpose of limiting the invention, FIG. 1 schematically illustrates an aircraft 10 adapted to be driven by a propeller 12 which, in the embodiment illustrated, comprises a pair of propeller blades 14 having mounting ends 16 and free ends 18. While not shown, it will be appreciated that aircraft 10 has an engine for driving a propeller drive shaft about an axis of rotations A and that blades 14 extend radially outwardly of axis A and have mounted ends 16 thereof suitably attached to the drive shaft for rotation therewith about axis A. As is further well known, the propeller drive shaft and the component parts by which the blades are attached thereto are enclosed is a shroud or spinner 20. Blades 14 are of airfoil profile in cross section transverse to the direction between ends 16 and 18 thereof, and this profile provides the blades with leading and trailing edges 22 and 24, respectively, and front and back faces 26 and 28, respectively. In the embodiment illustrated, edges 22 and 24 diverge relative to one another from mounting end 16 thereof toward free end 18 and, at a location spaced from end 16 toward end 18, have a dimension d therebetween. Dimension d is the major dimension with respect to the distance between the leading and trailing edges in that edges 22 and 24 of the blade converge relative to one another from the latter location outwardly toward free end 18. However, it will be appreciated that there are numerous blade edge contours other than that of the blade shown herein, and it will be understated that the location of major dimension d relative to mounting end 16 will vary depending on the blade design. For example, the edges of some blades diverge relative to one another substantially all the way to free end 18, whereby major dimension d would be near or at the free end.

Figure 2:
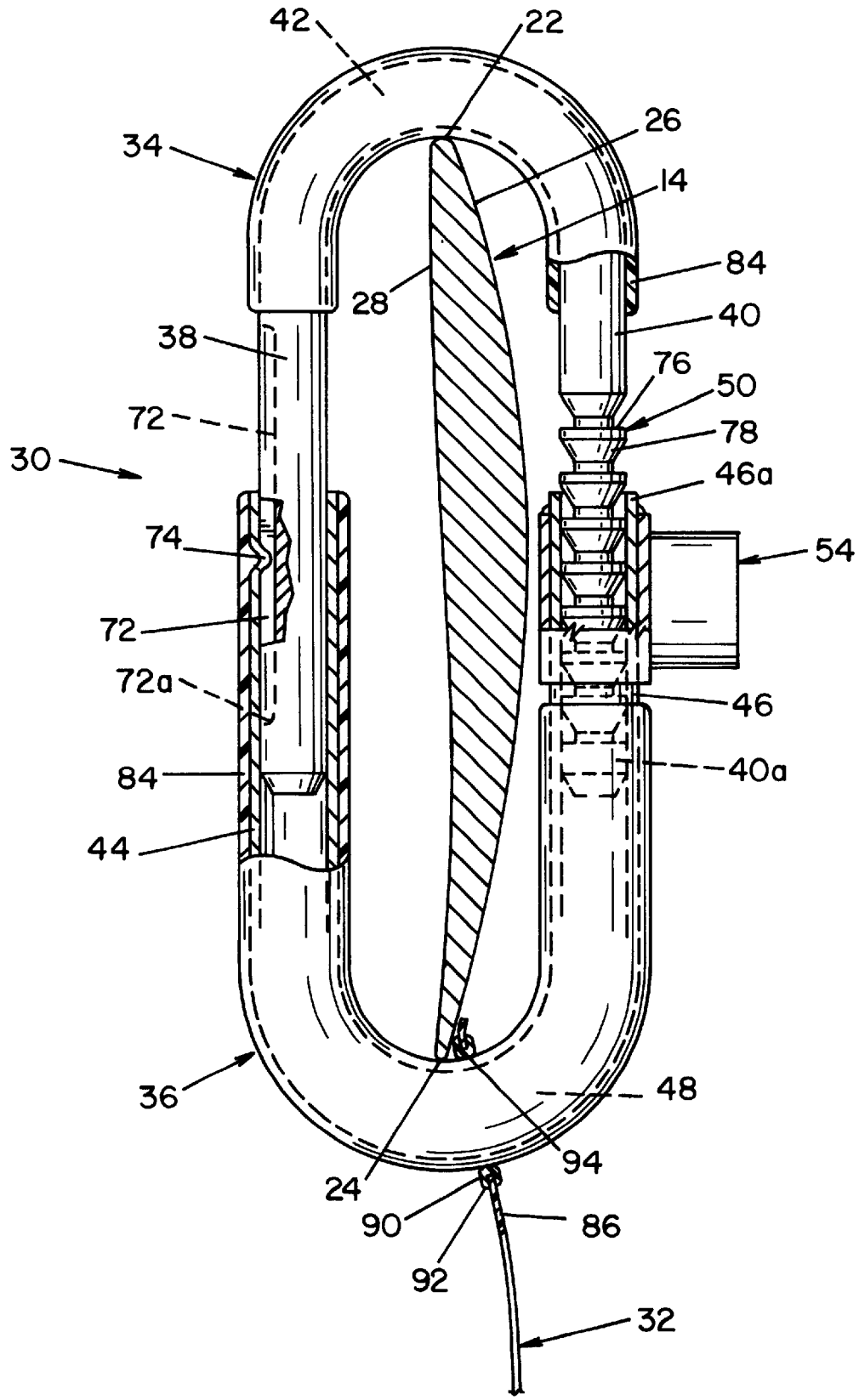
FIG. 2 is an elevation view, partially in section, taken along line 2—2 in FIG. 1 and showing the mounted relationship between the collar and propeller blade.

In accordance with the present invention, one of the blades 14 is provided with a security device comprising a collar 30 mounted on the blade between mounting end 16 thereof and the location of major dimension d. Preferably, a flag 32 in the form of a strip of flexible material is attached to collar 30 to provide a visual indication that the collar is mounted on the propeller blade. As best seen in FIGS. 2–4, collar 30 comprises a U-shaped collar member 34 of rod material and a U-shaped collar member 36 of tubular material. Collar member 34 includes parallel arms 38 and 40 interconnected by a bight portion 42, and collar member 36 comprises parallel tubular legs 44 and 46 interconnected by a bight portion 48. Legs 44 and 46 respectively slidably receive arms 38 and 40 of collar member 34, and collar members 34 and 36 are preferably fabricated from case-hardened steel so as to deter the sawing or cutting thereof. As will be described in greater detail hereinafter, collar members 34 and 36 are adapted to be mounted on blade 14 and releasably locked together in a mounted position thereon. For these purposes, the collar members are provided with a locking arrangement which, in the embodiment illustrated, comprises a plurality of latch elements in the form of ratchet teeth 50 on arm 40 of collar member 34 and a keeper member in the form of a pawl 52 in a lock housing 54 mounted on outer end 46a of leg 46 of collar member 36 such as by brazing or welding. Teeth 50 extend inwardly from outer end 40a of arm 40 and, as best seen in FIG. 4, pawl 52 is reciprocally supported in a bore 56 in housing 54 and an aligned opening 58 in leg 46 and includes a nose portion 60 engaging between adjacent ratchet teeth 50. A coil spring 62 biases pawl 52 for nose 60 thereof to engage between the ratchet teeth, and a key operated rotatable lock cylinder or tumbler 64 has a key receiving slot 65 and is operable through a blade member 66 on the inner end thereof to displace pawl 52 to the right in FIG. 4 against the bias of spring 62 so as to displace nose 60 from engagement with ratchet teeth 50. More particularly in this respect, pawl 52 is provided with a notch 68 receiving blade 66 and having an outer end 70 biased against blade 66 by spring 62 when pawl 52 is positioned to engage ratchet teeth 50. Blade 66 is offset from the axis of tumbler 64, whereby rotation of the tumbler in an unlocking direction through the use of a key inserted is slot 65 displaces blade 66 to the right in FIG. 4 to displace pawl 52 and thus nose 60 to the right to disengage the nose from ratchet teeth 50. This provides an unlocked condition for collar members 34 and 36 in which arms 38 and 40 are freely slidable in legs 44 and 46.

Preferably, the collar members are interconnected so as to preclude separation from one another when in the unlocked condition. In the embodiment illustrated, this is achieved by providing arm 38 of collar member 34 with an elongate linear recess 72 and providing leg 44 of collar member 36 with a radially inwardly extending dimple 74 slidably received in recess 72. Recess 72 is coextensive with teeth 50 on arm 40 and has an outer end 72a which, upon relative displacement of collar members 34 and 36 in the direction of separation thereof engages dimple 74 to preclude complete separation. This feature provides advantages in connection with the use of the anti-theft device which are set forth more fully hereinafter.

In the embodiment illustrated, each of the ratchet teeth 50 includes a flat, radially extending surface 76 and a conical camming surface 78 which, in connection with the corresponding surface 76, extends radially inwardly and axially toward free end 40a of arm 40. As best seen in FIG. 3, nose 60 of pawl 52 includes a flat surface 80 facing inwardly of leg 46 and a camming surface 82 facing outer end 46a of leg 46. Thus, when nose 60 is positioned between adjacent ratchet teeth 50, surface 80 facially engages surface 76 of one of the teeth and surface 82 faces camming surface 78 of the other. This provides a locked condition for collar members 34 and 36 in which, as will be appreciated from FIGS. 3 and 4, pawl surface 80 engages surface 76 of the adjacent ratchet tooth to lock collar members 34 and 36 against displacement in the direction of separation. As will be appreciated from FIGS. 2 and 3, when pawl 52 is positioned for collar members 34 and 36 to be in the locked condition, camming surface 82 of pawl nose 60 is positioned to be engaged by conical camming surfaces 78 of successive ratchet teeth 50 when arm 40 is advanced into leg 46. Thus, pawl 52 is cammed outwardly by each of the surfaces 78 against the bias of spring 62 which then displaces the pawl radially inwardly as nose 60 traverses the plane of tooth surface 76. Accordingly, arms 38 and 40 of collar member 34 can be advanced into legs 44 and 46 without having to use the key for the lock mechanism, whereby the latter is necessary only to unlock the collar members when it is desired to separate the collar members from the propeller blade.

It is believed that the mounting and dismounting of collar 30 on a propeller blade 14 will be clear from FIG. 1 and the foregoing description. In this respect, assuming collar 30 to be dismounted, the owner or other authorized person can unlock the collar members and relatively displace the latter in the direction of separation until recess 72 and dimple 74 interengage to preclude further separation. At this point, collar members 34 and 36 provide an elongate narrow opening having a dimension between the inner sides of bight portions 42 and 48 which is greater than major dimension d of the propeller blade. Accordingly, the collar members can be introduced onto the blade by inserting free end 18 thereof through the collar opening and advancing the collar to a location between major dimension d and mounted end 16 of the blade. At this time, the collar members can be locked and then closed relative to one another, or closed relative to one another and then locked for bight portions 42 and 48 to engage blade edges 22 and 24 at a location between mounted end 16 and major dimension d. Preferably, such mounting will be as close to dimension d as possible so that the weight of the collar, which is about two to three pounds, will optimize the off balance condition of the propeller in the event the aircraft engine is started by a thief of other unauthorized person. It will be appreciated that the ratchet teeth and pawl arrangement provides for varying the distance between the inner sides of bight portions 42 and 48 of the collar members and therefore enables use of the collar with propeller blades having different major dimensions d as well as for selectively positioning the collar radially outwardly of mounting end 16 toward the location of major dimension d as mentioned above. Preferably, the interior sides of arms 38 and 40 and legs 44 and 46 are laterally spaced apart about 2-5/8" so as to span blade surfaces 26 and 28 in relatively close proximity thereto. This enables controlling the amount of displacement of the collar that can take place relative to the blade and minimizing the amount of material required to fabricate the collar. Further, at least the bight portion 42 of collar member 34 and a portion of arms 38 and 40 thereof as well as legs 44 and 46 and bight portion 48 of collar member 34 are covered by a layer of elastomeric material 84 so as to protect propeller blade 14 from abrasion by engagement with the metal of the collar members.

When the owner of the aircraft or other authorized person wishes to operate the aircraft, he or she merely unlocks the collar members in the manner described hereinabove and separates the latter sufficiently for removal of the collar across major dimension d and off the free end of the blade. The interengagement between collar members 34 and 36 described hereinabove for the purpose of precluding separation of the collar members is preferred for safety reasons and to minimize losing or misplacing the collar when it is removed from the blade. In this respect, for example, the owner or other authorized person may for one reason or another remove the collar and lay it, for example, on the air intake of the engine while attending to some further chore prior to operating the aircraft. If the collar is in two pieces, either one of the collar members could be small enough to be sucked into the engine upon operation thereof should the owner forget to remove them from the air intake. By providing for the collar members to be inseparable, the likelihood of the one-piece collar being small enough to enter through the air intake is minimized under such conditions. As another example, should the owner remove and lay the collar or collar members on any part of the aircraft from which they could vibrate and fall to the ground upon operation of the aircraft, the likelihood of finding the collar as one piece is greater than that of finding the two pieces which may have dropped to the ground at two different locations remote from one another. Finally, the manipulating of the collar members for mounting and dismounting of the collar on a propeller blade as well as the handling of the collar in connection with storing and retrieving the latter from the aircraft is enhanced and made easier by the interconnected collar member construction and, importantly, promotes use of the device by the owner.

Figure 6:
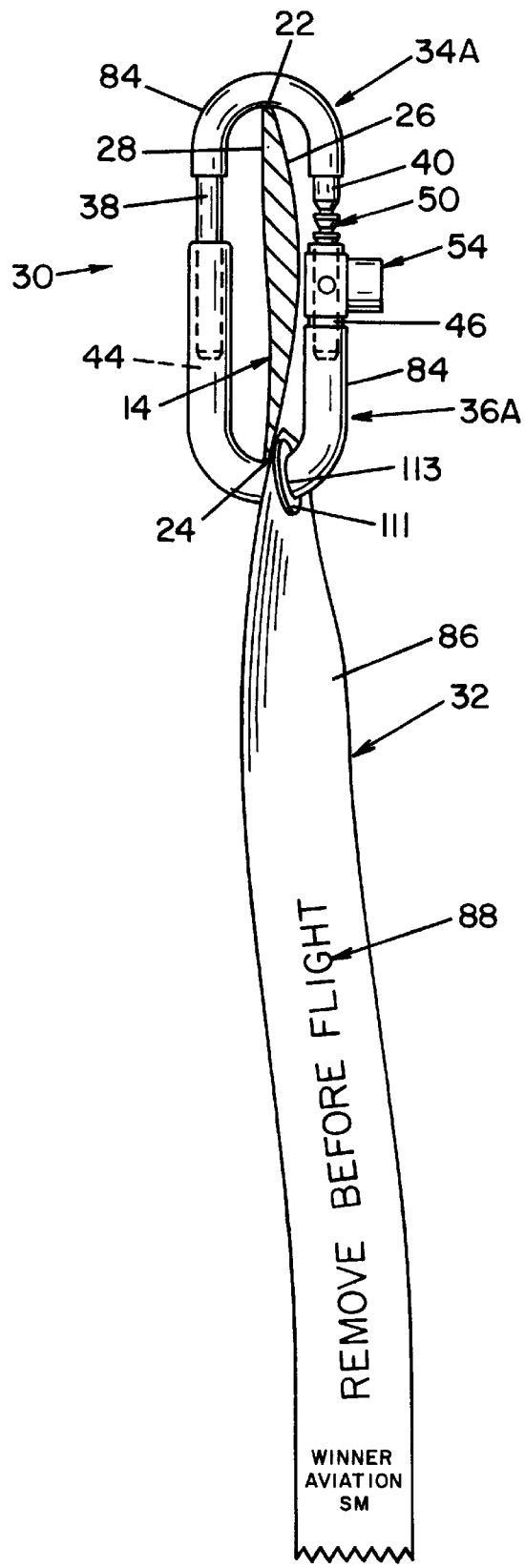
FIG. 6 is an elevation view showing another embodiment of a security device in accordance with the invention.

As mentioned hereinabove and shown in FIGS. 1–3 and 6, a flag 32 in the form of a narrow strip of flexible material 86, preferably about two feet in length, is attached to collar 30 to alert a potential thief or other unauthorized person to the fact that the collar is attached to one of the aircraft's propeller blades, whereby safe operation of the aircraft would be adversely affected. The flag also serves as a reminder for the owner of the aircraft, or other authorized personnel, to remove the collar before starting the aircraft engine. Preferably, the flag is of a flexible material capable of withstanding adverse weather conditions including rain, sun and wind such as, for example, materials that sails are made from, such as Dacron and Mylar, as well as other weatherable materials such as nylon. At the same time, it will be appreciated that the flag could be made of a suitable plastic material having a thickness and composition for withstanding the stress of wind and other adverse weather conditions. It is also preferred to provide for material 86 to be of a bright color, such as red, so as to enhance attracting attention thereto, and the flag is preferably provided with written indicia 88 of a contrasting color such as white for further enhancing the attraction of a person's attention thereto. Such indicia could provide a specific warning or, as indicated in FIGS. 1 and 6, a reminder that the collar must be removed before flight which implies that flight is not possible with the collar mounted on the propeller blade. In the embodiment of flag 32 shown in FIGS. 1 and 2, the flag is removably mounted on collar 30 by providing one end of the flag with an annular split ring 90 of plastic material having an outer periphery 92 which is recessed to receive flag material 86 therein and which is crimped to clampingly engage the material in the recess so as to securely mount the ring on the flag. Ring 90 and material 86 between the ring and the upper end of the flag are split, whereby the ring can be distorted for mounting on one of the collar members, and ring 90 provides an annular opening 94 through the flag of a diameter to slidably receive either one of the collar members 34 and 36. In the embodiment of flag 32 shown in FIG. 3, flag material 86 is provided with an eyelet 96 suitably secured thereto such as by crimping and which provides an opening through the end of the flag which is smaller than the opening provided by split ring 90. In this embodiment, the flag is removably mounted on one of the collar members through the use of a resilient shower curtain-type hook 98 having a circular end portion 100 large enough to receive either one of the collar members and having a narrow arcuate lower end 102 for receiving eyelet 96. In a well-known manner, hook 98 includes a latch arrangement 104 for selectively opening and closing the hook for mounting and dismounting the latter relative to a collar member and/or mounting and dismounting flag 32 on the hook. It is contemplated that flag 32, in being subjected to widely varying weather conditions over long periods of time, will require frequent replacement. The ease of such replacement is enhanced through the use of a hook arrangement such as that shown in FIG. 3.

FIG. 5 of the drawing illustrates a modification of the arrangement by which collar members 34 and 36 are interengaged against complete separation. In this respect, arm 38 of collar member 34 is provided with a radially inwardly extending circumferential recess 106 which provides a head 108 on the terminal end of leg 38 and which extends along the leg from head 108 a distance at least equal to that of ratchet teeth 50 on leg 40. Head 108 is axially slidably received in leg 44, and the outer end of leg 44 is provided with a radially inwardly extending circumferential flange 110 which axially slidably receives the portion of arm 38 defined by recess 106. Accordingly, it will be appreciated that relative displacement between collar members 34 and 36 in the direction of separation thereof will bring head 108 into engagement with flange 110 to preclude complete separation of the collar members.

While it is preferred for the reasons set forth hereinabove to interengage the collar members against total separation, it will be appreciated that the collar members can be totally separable without affecting the operation thereof in connection with providing an anti-theft device in accordance with the invention. Such separability is illustrated in connection with the embodiment of collar 30 illustrated in FIG. 6 wherein arm 38 of collar member 34A and leg 44 of collar member 36A are not provided with interengaging components, whereby arms 38 and 40 can be slidably removed from within tubular legs 44 and 46. This embodiment of collar 30 also provides for a modification of flag 32. In this respect, the mounted end of the flag can be provided with an eyelet 111 of plastic or the like crimped on flag material 86 as previously described and providing an opening 113 therethrough large enough to receive either one of the collar members. Separability of the collar members provides for the flag to be mounted thereon or removed therefrom without having to provide for the eyelet to be a split ring or by providing a separate hook or other fastener arrangement for facilitating replacement of the flag.

Figure 7:
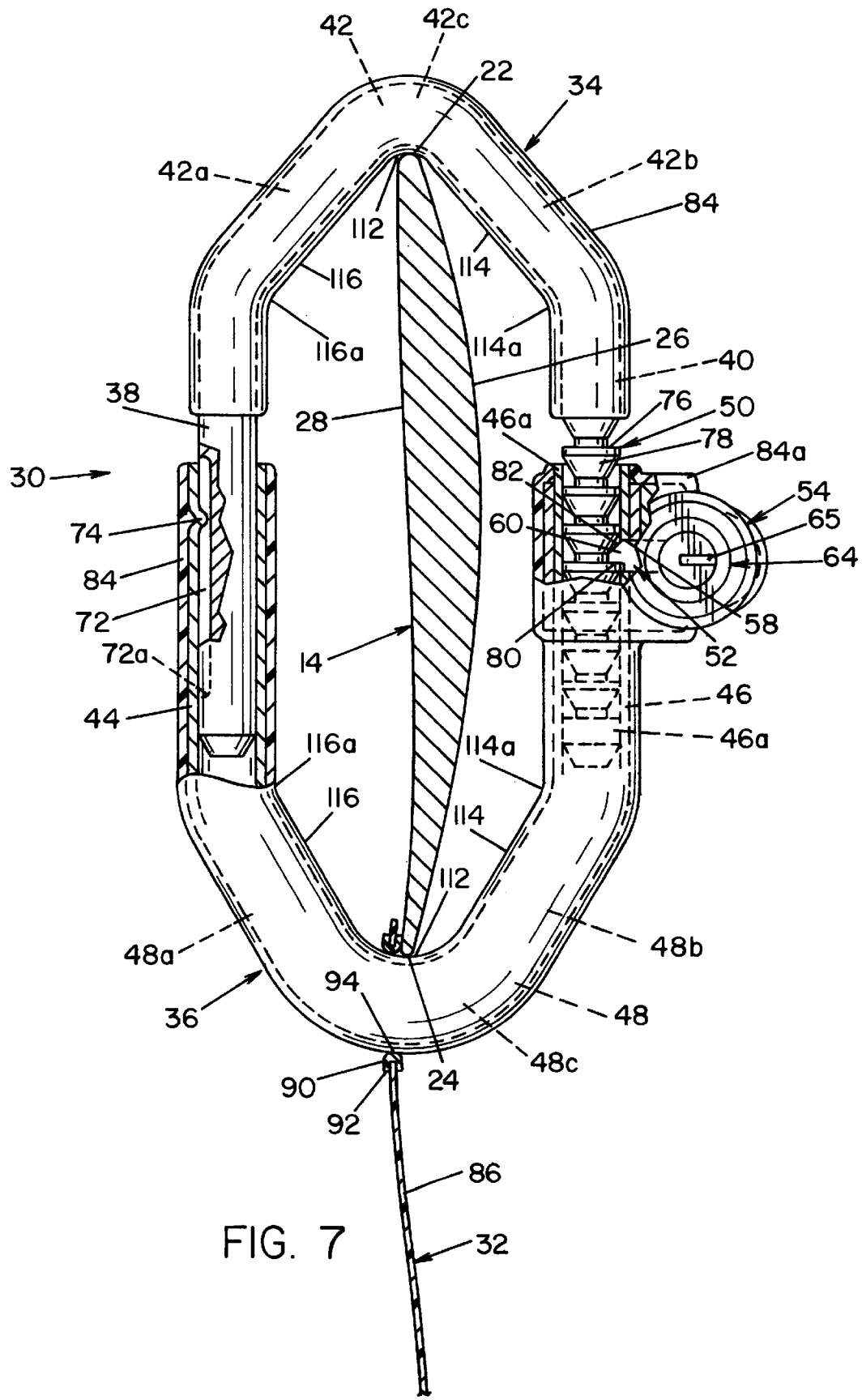
FIG. 7 is an elevation view, similar to FIG. 2, and showing another embodiment of a security device in accordance with the present invention mounted on a blade of an aircraft propeller; and, FIG. 8 is a cross-sectional view of the root of an aircraft propeller blade and showing the mounted relationship of the device of FIG. 7 therewith.
Figure 8:
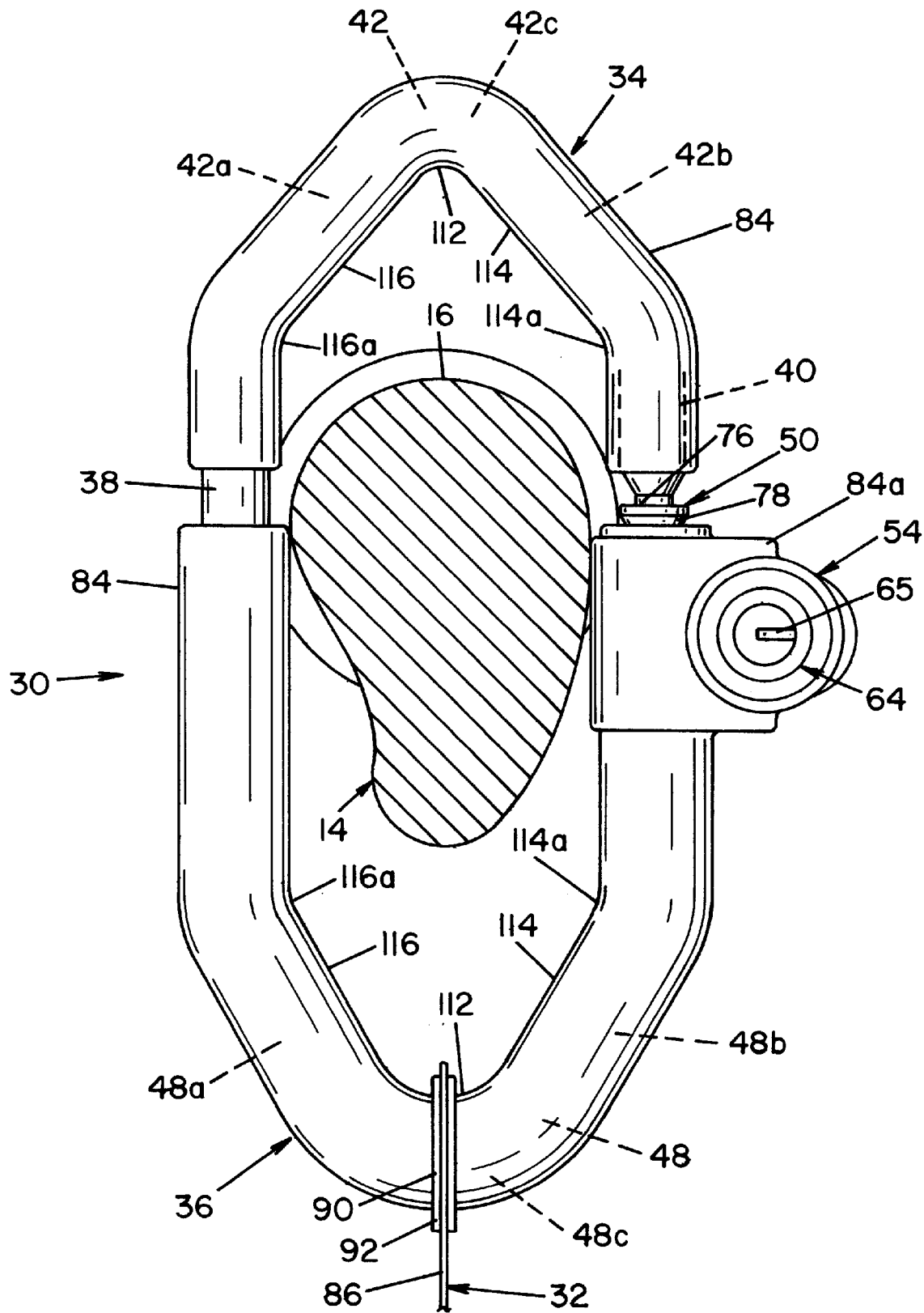

FIGS. 7 and 8 of the drawing illustrate a modification of the collar members of the collar devices 30 herein illustrated and described and a security device in which the bights of the two collar members are of a contour which more closely corresponds to the contours of the leading and trailing edges of the propeller blade than do the U-shaped configurations of the earlier embodiments. Like numerals appear in FIGS. 7 and 8 to designate parts of the collar members corresponding to those in the preceding embodiments and, while FIGS. 7 and 8 illustrate collar members interengaging in the manner of the embodiment illustrated in FIGS. 2 and 3 of the drawing, it will be appreciated that the present embodiment is applicable to the other interengaging relationships illustrated and described herein.

In the embodiment illustrated in FIGS. 7 and 8, bight portion 42 of collar member 34 is modified to have a V-shaped contour providing linear bight sections 42a and 42b respectively between the base 42c of the bight portion and arms 38 and 40 of the collar member. Similarly, bight portion 48 of collar member 36 is modified to have a V-shaped contour providing linear bight sections 48a and 48b respectively between the base 48c of the bight portion and legs 44 and 46 of collar member 36. The V-shaped configuration of the bights provides each of the latter with an inner bottom corner 112 and corresponding wedging surfaces 114 and 116 extending from bottom corner 112 respectively across front and back faces 26 and 28 of the blade adjacent the corresponding blade edge. As will be appreciated from FIG. 7, bottom corners 112 wedgingly interengage with the leading and trailing edges 22 and 24 of propeller blade 14 and restrain pivotal displacement of the collar relative to the propeller blade about an axis through the bottom corners of the bight portions. This advantageously restrains such displacement as would cause the collar to engage with and potentially damage one or the other or both of the opposite sides of the blade. Further in connection with the V-shaped configuration of the bight portions and the interengagement thereof with a propeller blade as described above to restrain pivotal displacement of the collar relative to the blade, arms 38 and 40 of collar member 34 and legs 44 and 46 of collar member 36 are preferably spaced apart on the interior sides thereof about 2-⅝". In connection with optimizing protection of the propeller blade from damage by contact with the collar, the covering of elastomeric material 84 can be extended to enclose lock housing 54 as indicated by covering portion 84a in FIG. 7.

A further advantage in connection with the V-shaped configuration of the bight portions of the collar shown in FIG. 7 resides in the fact wedging surfaces 114 and 116 together with the points 114a and 116a at which the wedging surfaces merge with the arms and legs of the collar members provide additional interior wedging contours at the opposite ends of the collar which preclude the collar from sliding along the blade and across the root or mounting end 16 thereof into engagement with shroud 20. More particularly in this respect, as will be appreciated from FIG. 8, when collar 30 is displaced toward mounting end 16 of blade 14, the leading and trailing edges of the blade converge toward one another and the blade thickens between the latter edges and the opposite sides thereof, whereby the inner surfaces of the arms and legs of the collar members interengage with the outer surface of the mounting end of the blade to position the latter radially outwardly of shroud 20. The latter will be appreciated from FIG. 8 taken in conjunction with the illustration of the mounting or root ends 16 of blades 14 in FIG. 1. As will be further appreciated from FIG. 8, displacement of collar 30 in either direction with respect to moving a bottom corner 112 toward root 16 will result in a wedging engagement between the outer surface of the root, wedging surfaces 114 and 116 and the inner surfaces of the arms and legs of the collar members. Thus, should an unauthorized person attempt to operate the aircraft and abandon the effort leaving the blade with the collar thereon either in a horizontal position, an upwardly inclined position, or in a position extending upwardly from the shroud, the inner wedging surface configuration of the collar members will preclude the collar from descending into engagement with and potentially damaging the propeller shroud.

While considerable emphasis has been placed on the preferred embodiments of the anti-theft device herein illustrated and described, it will be appreciated that other embodiments of the device can be made and that changes can be made in the preferred embodiments without departing from the principles of the invention. In particular in this respect, it will be appreciated that other arrangements for lockingly interengaging the collar members in a mounted position on a propeller blade can be provided such as, for example, semicircular recesses in arm 40 to provide the latch elements provided by ratchet teeth 50 in the preferred embodiment, and a rotatable semi-circular member providing a keeper having engaged and disengaged positions relative to the recesses for respectively preventing and allowing relative sliding engagement between the collar members. Further, other arrangements can be provided for attaching flag 32 to the collar such as, for example, a chain extending through an eyelet opening and through the collar. These and other changes will be suggested and obvious to those skilled in the art from the disclosure herein, whereby it is to be distinctly understood that the foregoing descriptive matter is to be interpreted merely as illustrative of the invention and not as a limitation.

Having thus described the invention, it is claimed:

1. An anti-theft device for attachment to an aircraft propeller blade having mounted and free ends relative to said aircraft and leading and trailing edges diverging relative to one another in the direction from said mounted end toward said free end, said device comprising a collar for extending about said blade and interengaging with said diverging leading and trailing edges at a location spaced from said mounted end to preclude displacement of said collar relative to said blade in the direction from said location toward said free end, said collar being adjustable in the direction between said leading and trailing edges for said location to be at a selectable distance from said mounted end, and means for releasably locking said collar on said blade, said blade being of airfoil contour in cross section transverse to the direction between said ends, said contour providing said leading and trailing edges, and said collar including first and second collar members providing opposed V-shaped end portions for engaging the leading and trailing edges of the blade.

2. The anti-theft device according to claim 1, further including an elongate strip of flexible material attached to said collar.

3. The anti-theft device according to claim 2, wherein said strip of flexible material is of a bright color for enhancing visibility thereof.

4. The anti-theft device according to claim 2, wherein said strip of flexible material includes written indicia thereon.

5. The anti-theft device according to claim 2, wherein said strip of flexible material is removably attached to said collar.

6. The anti-theft device according to claim 1, wherein said collar members are covered with a layer of elastomeric material for protecting said blade.

7. The anti-theft device according to claim 1, wherein said airfoil contour provides closely spaced apart front and back surfaces between said edges and said collar members include straight portions extending between said end portions outwardly adjacent said front and back surfaces.

8. The anti-theft device according to claim 7, further including an elongate strip of flexible material having an end including an annular mounting ring for slidably receiving said end portions and said straight portions of said first and second collar members.

9. The anti-theft device according to claim 1, wherein said collar includes a first member having a closed end and parallel arms and a second member having a closed end and parallel tubular legs for slidably receiving said arms, said means for releasably locking said collar on said blade including a lock for precluding displacement of said arms in the direction of separation of said arms from said legs.

10. The anti-theft device according to claim 9, wherein said lock includes a plurality of latch elements along one of said parallel arms, and a keeper on the one of said parallel legs receiving said one arm for interengaging with said latch elements to preclude displacement of said arm in the direction of separation of said arms from said legs.

11. The anti-theft device according to claim 10, wherein said lock further includes a keeper actuator for selectively displacing said keeper between locking and unlocking positions relative to said latch elements, said keeper in said unlocking position disengaging said latch elements and permitting displacement of said arms in the direction of separation of said arms from said legs.

12. The anti-theft device according to claim 11, wherein said keeper actuator is key operated.

13. The anti-theft device according to claim 11, wherein said keeper in said locking position interengages with said latch elements to preclude displacement of said arms in the direction of separation of said arms from said legs and to permit displacement of said arms into said legs.

14. The anti-theft device according to claim 13, and an elongate strip of flexible material mounted on said collar, said strip including an end having an annular mounting ring thereon for slidably receiving said arms and said legs.

15. The anti-theft device according to claim 10, and an elongate strip of flexible material mounted on said collar, said strip including an end having an annular mounting ring thereon for slidably receiving said arms and said legs.

16. The anti-theft device according to claim 10, wherein said lock includes a plurality of ratchet teeth on one of said parallel arms, a pawl on the one of said parallel legs receiving said one arm, and means for displacing said pawl between engaging and disengaging positions relative to said ratchet teeth to respectively preclude and permit displacement of said arms in the direction of separation of said arms from said legs.

17. The anti-theft device according to claim 16, wherein said pawl is spring biased to said engaging position, and said lock further includes a key operated tumbler for displacing said pawl from said engaging position to said disengaging position against said spring bias.

18. The anti-theft device according to claim 17, wherein said key operated means is in a lock housing on said one leg.

19. The anti-theft device according to claim 17, wherein each ratchet tooth includes a flat stop surface engaged by said pawl in said engaging position to prevent displacement of said arms in the direction of separation of said arms from said legs, and a camming surface sloping relative to the stop surface for displacing said pawl from said engaging position to said disengaging position against said spring bias to permit displacement of said arms into said legs.

20. The anti-theft device according to claim 17, wherein said arms and legs are covered with a layer of elastomeric material for protecting said blade.

21. The anti-theft device according to claim 17, and an elongate strip of flexible material mounted on said collar, said strip including an end having an annular mounting ring thereon for slidably receiving said arms and said legs.

22. The anti-theft device according to claim 21, wherein said strip of flexible material is of a bright color for enhancing visibility thereof and wherein said strip of flexible material includes written indicia thereon.

23. An anti-theft device for attachment to an aircraft propeller blade having mounted and free ends relative to said aircraft and leading and trailing edges diverging relative to one another in the direction from said mounted end toward said free end, said device comprising a collar for extending about said blade and interengaging with said diverging leading and trailing edges at a location spaced from said mounted end to preclude displacement of said collar relative to said blade in the direction from said location toward said free end, said leading and trailing edges of said blade having a major dimension therebetween at a location between said mounted and free ends, said collar comprising first and second collar members having spaced apart opposed surfaces for engaging said leading and trailing edges, said first and second collar members interengaging for linear sliding displacement relative to one another between first and second positions, said opposed surfaces in said first and second positions respectively being spaced apart a distance less and a distance greater than said major dimension, said first collar member including parallel arms and a first V-shaped bight therebetween, said second collar member including parallel tubular legs slidably receiving said arms, said legs having a second V-shaped therebetween, said first and second bights providing said opposed surfaces, and a lock for releasably holding said arms and said legs in said first position of said collar members.

24. The anti-theft device according to claim 23, and a stop for stopping said relative displacement in the direction from said first position toward said second position when said collar members reach said second position.

25. An anti-theft device for attachment to an aircraft propeller blade having mounted and free ends relative to said aircraft and leading and trailing edges diverging relative to one another in the direction from said mounted end toward said free end, said device comprising a collar for extending about said blade and interengaging with said diverging leading and trailing edges at a location spaced from said mounted end to preclude displacement of said collar relative to said blade in the direction from said location toward said free end, said leading and trailing edges of said blade having a major dimension therebetween at a location between said mounted and free ends, said collar comprising first and second collar members having spaced apart opposed surfaces for engaging said leading and trailing edges, said first and second collar members interengaging for linear sliding displacement relative to one another between first and second positions, said opposed surfaces in said first and second positions respectively being spaced apart a distance less and a distance greater than said major dimension, said first collar member including parallel arms and a first bight therebetween, said second collar member including parallel tubular legs slidably receiving said arms, said legs having a second bight therebetween, said first and second bights providing said opposed surfaces, a lock for releasably holding said arms and said legs in said first position of said collar members, each said first and second bight being one of a U-shaped bight and a V-shaped bight, one of said arms and the one of said legs slidably receiving said one arm including interengaging means for stopping slidable displacement between said legs and arms in the direction of separation thereof, and said interengaging means including a slot in said one arm and a projection on said one leg received in said slot.

26. An anti-theft device for attachment to an aircraft propeller blade having mounted and free ends relative to said aircraft and leading and trailing edges diverging relative to one another in the direction from said mounted end toward said free end, said device comprising a collar for extending about said blade and interengaging with said diverging leading and trailing edges at a location spaced from said mounted end to preclude displacement of said collar relative to said blade in the direction from said location toward said free end, said leading and trailing edges of said blade having a major dimension therebetween at a location between said mounted and free ends, said collar comprising first and second collar members having spaced apart opposed surfaces for engaging said leading and trailing edges, said first and second collar members interengaging for linear sliding displacement relative to one another between first and second positions, said opposed surfaces in said first and second positions respectively being spaced apart a distance less and a distance greater than said major dimension, said first collar member including parallel arms and a first bight therebetween, said second collar member including parallel tubular legs slidably receiving said arms, said legs having a second bight therebetween, said first and second bights providing said opposed surfaces, a lock for releasably holding said arms and said legs in said first position of said collar members, each said first and second bight being one of a U-shaped bight and a V-shaped bight, one of said arms and the one of said legs slidably receiving said one arm including interengaging means for stopping slidable displacement between said legs and arms in the direction of separation thereof, and said interengaging means including means on said one arm providing a radially outwardly extending abutment, and means on said one leg providing a radially inwardly extending shoulder in the path of said abutment.

27. The anti-theft device according to claim 26, wherein said one arm has a head providing said abatement and said one leg has a radially inwardly extending flange providing said shoulder.

28. The anti-theft device according to claim 23, wherein said lock includes a plurality of latch elements along one of said parallel arms, and a keeper on the one of said parallel legs receiving said one arm for interengaging with said latch elements to preclude displacement of said arm in the direction of separation of said arms from said legs.

29. The anti-theft device according to claim 28, wherein said lock further includes a keeper actuator for selectively displacing said keeper between locking and unlocking positions relative to said latch elements, said keeper in said unlocking position disengaging said latch elements and permitting displacements of said arms in the direction of separation of said arms from said legs.

30. The anti-theft device according to claim 29, wherein said keeper actuator is key operated.

31. The anti-theft device according to claim 30, wherein an elongate strip of flexible material is mounted on said collar, said strip including an end having an annular mounting ring thereon for slidably receiving said arms and said legs.

32. The anti-theft device according to claim 30, wherein each said first and second bight is U-shaped.

* * * * *